United States Patent
Hämäläinen et al.

(10) Patent No.: US 6,359,904 B1
(45) Date of Patent: Mar. 19, 2002

(54) DATA TRANSFER IN A MOBILE TELEPHONE NETWORK

(75) Inventors: Jari Hämäläinen; Arto Leppisaari, both of Tampere; Kari Huttunen, Oulu, all of (FI)

(73) Assignee: Nokia Mobile Phone Ltd., Espoo (FI)

( * ) Notice: Subject to any disclaimer, the term of this patent is extended or adjusted under 35 U.S.C. 154(b) by 0 days.

(21) Appl. No.: 09/134,615

(22) Filed: Aug. 14, 1998

(30) Foreign Application Priority Data

Aug. 18, 1997 (FI) .................................................. 973373

(51) Int. Cl.[7] .............................. H04J 3/16; H04J 3/22
(52) U.S. Cl. ........................ 370/469; 370/328; 455/422
(58) Field of Search ................................ 370/328, 329, 370/336, 337, 345, 347, 465, 469; 455/422, 450

(56) References Cited

U.S. PATENT DOCUMENTS

| | | | |
|---|---|---|---|
| 5,257,257 A | | 10/1993 | Chen et al. |
| 5,396,653 A | | 3/1995 | Kivari et al. |
| 5,430,740 A | | 7/1995 | Kivari et al. |
| 5,563,895 A | * | 10/1996 | Malkamaki et al. ........ 714/748 |
| 5,570,353 A | | 10/1996 | Keskitalo et al. |
| 5,577,024 A | | 11/1996 | Malkamaki et al. |
| 5,606,548 A | | 2/1997 | Vayrynen et al. |
| 5,640,395 A | | 6/1997 | Hamalainen et al. |
| 5,642,354 A | * | 6/1997 | Spear .......................... 370/329 |
| 5,708,656 A | | 1/1998 | Noneman et al. |
| 5,726,981 A | | 3/1998 | Ylitervo et al. |
| 5,729,534 A | | 3/1998 | Jokinen et al. |
| 5,729,541 A | | 3/1998 | Hamalainen et al. |
| 5,742,592 A | * | 4/1998 | Scholefield et al. ........ 370/329 |
| 5,745,503 A | | 4/1998 | Kuusinen |
| 5,745,695 A | * | 4/1998 | Gilchrist et al. ............ 709/227 |
| 5,752,193 A | * | 5/1998 | Scholefield et al. ........ 455/452 |
| 5,764,632 A | | 6/1998 | Ylitervo |
| 5,790,156 A | | 8/1998 | Mutton et al. |
| 5,790,534 A | | 8/1998 | Kokko et al. |

FOREIGN PATENT DOCUMENTS

| | | |
|---|---|---|
| WO | WO 96/27959 | 9/1996 |
| WO | WO 96/27960 | 9/1996 |
| WO | WO 97/16899 | 5/1997 |
| WO | WO 97/28607 | 8/1997 |
| WO | WO 98/21840 | 5/1998 |

OTHER PUBLICATIONS

UK Search Report.
"Digital Cellular Telecommunications System(Phase 2+)"; General Packet Radio Service (GPRS); Service description: Stage 2 (GSM 03.60 version 5.2.0).

(List continued on next page.)

Primary Examiner—Ajit Patel
Assistant Examiner—Bob A. Phunkulh
(74) Attorney, Agent, or Firm—Perman & Green, LLP

(57) ABSTRACT

The scope of the present invention is a method for data transfer in a digital mobile communications system, in which method it is handled data in certain layers according to certain protocols, in a certain layer out of said layers it is transferred user data in radio blocks (RB) over a physical radio channel between a mobile station and a fixed mobile communications network, for the transfer of said certain layer it is formed in the radio block (RB) a payload of a certain size comprising check bits (CHB) connected with the performing of the transfer and transfer bits (TB) available for the transfer of user data, each radio block (RB) is channel coded using a certain coding method and the size of said payload is dependent on the coding method. In the transfer bits (TB) of the radio block to be coded using at least a certain coding method it is transferred user data in a first part of the transfer bits and in a second part of the transfer bits it is transferred fill bits in such a way that it is chosen for the transfer of user data a number of transfer bits divisible by eight.

12 Claims, 3 Drawing Sheets

OTHER PUBLICATIONS

"Digital Cellular Telecommunications System"; General Packet Radio Service (GPRS); Mobile Station—Serving GPRS Support Node (MS–SGSN) Logical Link Control (LLC) Layer Specification (GSM 04.64 version 5.1.0).

"Digital Cellular Telecommunications System(Phase 2+)"; General Packet Radio Service (GPRS); Mobile Station (MS)—Serving GPRS Support Node (SGSN): Subnetwoork Dependent Convergence Protocol (SNDCP) (GSM 04.65 version 5.0.0).

"Digital Cellular Telecommunications System(Phase 2+)"; General Packet Radio Service (GPRS); Overall description of the GPRS radio interface; Stage 2 (GSM 03.64 version 5.0.0).

PCT International Search Report.

* cited by examiner

DATA TRANSFER IN A MOBILE TELEPHONE NETWORK

FIELD OF THE INVENTION

The present invention relates to a method for data transfer in a digital mobile communications network, in which method it is handled user data in certain layers according to certain protocols, in a certain layer of said layers it is transferred user data over a physical radio channel between a mobile station and a fixed mobile communications network in radio blocks, for the transfer of said layer it is formed in the radio block a payload of a certain size comprising check bits connected with the performing of the transfer and transfer bits available for the transfer of user data, each radio block is channel coded using a certain coding method and the size of said payload is dependent on the coding method. The invention also relates to a transmitter/receiver device operating according to the method and a mobile communications system. The invention relates in particular to data transfer in the GSM-system in the GPRS-packet switched service.

BACKGROUND OF THE INVENTION

Out of the present mobile communications systems a majority is offering data- and voice services based upon circuit switched technique. In the circuit switched technique a transfer connection is maintained during the whole connection even if no information would be transferred time to time. This unnecessarily consumes the transfer resources, shared by also many other users, in which case the maintaining of a circuit switched transfer connection to one user consumes unnecessarily the transfer resources of other users. Because of the bursts in the GSM-transmission, data services are not optimal in the circuit switched technique. However, the packet switched information transfer for the increasing of the efficiency of the utilization of a channel is known.

As well as the fixed network also a future mobile communications network must be able to transfer both circuit switched and packet data transfer, e.g. ISDN-transfer (Integrated Services Digital Network) and ATM-transfer (Asynchronous Transfer Mode). For information transfer using packet switching it is known in mobile communications systems a protocol based upon packet reservation multiple access called PRMA (PRMA, Packet Reservation Multiple Access). It is also spoken of as packet radio. PRMA is a technique for multiplexing digital speech or data in a time division carrier wave, i.e. PRMA uses in a radio channel a time division multiple access (TDMA, Time Division Multiple Access), in which case transmission and reception take place at certain moments using time division. The PRMA-protocol has been developed to utilize the discontinuity of speech transfer in order to support more users than the number of speech channels in a time division carrier wave. In such a case a channel is allocated to a mobile station, for example a speech channel when speech is being produced and when the speaking ends the channel is released, in which case the mobile station does not unnecessarily reserve capacity, but the channel is channel is free for other purposes, for example the transmissions of other mobile stations in the cell. The PRMA-protocol is used in cellular mobile communications systems in the communication between a mobile station and a base station. The GSM GPRS (General Packet Radio Service)-system is an example of a system based upon a PRMA-type protocol.

GPRS is a new GSM-service, by using which the packet radio operation can be made available to GSM-users. GPRS reserves radio resources only when there is something to transmit, in which case the same resources are shared between all mobile stations as needed. The normal circuit switched network of the GSM-system has been designed for circuit switched speech transmissions. The main goal of the GPRS-service is to realize the connection from a mobile station to a public data network using prior known protocols, such as TCP/IP and X.25. However, there is a connection between the packet switched GPRS-service and the circuit switched services of the GSM-system. In a physical channel resources can be reused and certain signalling can be common to both. It is possible to reserve in the same carrier wave time slots for circuit switched use and for the packet switched GPRS-use.

FIG. 1 presents telecommunication network connections in a packet switched GPRS-service. The main element of the infrastructure of the network for GPRS-services is a GPRS-support node, so called GSN (GPRS Support Node). It is a mobility router which realizes the connecting and co-operation between different data networks, for instance to PSPDN (Packet Switched Packet Data Network) through interface Gi or to another operator's GPRS-network through interface Gp, mobility management using GPRS-registers over interface Gr and the transfer of data packets to mobile stations MS independent of their location. It is possible to integrate physically GPRS-node GSN with mobile switching center MSC (Mobile Switching Center) or it can be a separate network element based upon the architecture of data network routers. User data passes directly between support node GSN and base stations system BSS, consisting of base stations BTS and base station controllers BSC, through interface Gb, but between support node GSN and mobile switching center MSC there is signalling interface Gs. In FIG. 1 the uninterrupted lines between blocks represent data traffic (i.e. the transfer of speech or data in a digital form) and the interrupted lines represent signalling. Physically the data can pass transparently over mobile switching center MSC. The radio interface between mobile station MS and the fixed network passes through base station BTS and it has been marked with reference Um. References Abis and A represent the interface with base station BTS and base station controller BSC, and respectively between base station controller BSC and mobile switching center MSC, which is a signalling connection. Reference Gn represents an interface between the different support nodes of the same operator. The support nodes are normally divided into gateway support nodes GGSN (Gateway GSN) and serving or home support nodes SGSN (Serving GSN) as presented FIG. 1.

The GSM-system is a time division multiple access-type (TDMA, Time Division Multiple Access) system, in which the traffic in the radio path is time-divided and takes place in repeated TDMA-frames, each of which consists of several (eight) time slots. In each time slot it is transmitted an information packet in form of a radio frequency burst of finite duration consisting of a number of modulated bits. The time slots are mainly used as control channels and traffic channels. On the traffic channels it is transferred speech and data and in the control channels it is carried out signalling between base station BTS and mobile station MS.

In the following it is explained the protocols of GPRS and the protocol hierarchy in radio interface Um between mobile station MS and a fixed network (home support node SGSN) with reference to FIG. 2a. User data is handled hierarchically on different levels, when it is converted into a form suited for the physical radio path and the public data network. On the highest level A) the user data (coming e.g.

from an application App) is in a form suited for the protocol of the public data network, such as TCP/IP and X.25 and on the lowest level E) the data is in a form suited for transferring in the GSM-radio path.

The highest level A) protocol SNDCP (Subnetwork Dependent Convergent Protocol), i.e. a convergence protocol dependent of a subnetwork is explained in more detail in GSM radio specifications 04.65 and 03.60. According to SNDCP a network protocol data unit is segmented between mobile station MS and home support node SGSN into one or several SNDCP data units, the maximum size of the payload of which is approximately 1600 octets. The SNDCP-data unit is transferred in one LLC-fame (Logical Link Control) over the radio interface. The SNDCP-protocol includes multiplexing of user data, segmenting and compressing, and the compressing of the TCP/IP-header. It is possible to transfer in the SNDCP-protocol different network level protocols, such as IP, X.25, PTM-M and PTM-G. The size of a SNDCP user data field is, as to the total number of bits, divisible by eight bits, i.e. it is octet oriented.

The protocol of the next B) level, the LLC-protocol or the logical link control protocol has been explained in more detail in GSM standard specifications 04.64 and 03.60. The LLC-protocol provides a reliable logical link between a mobile station and home support node SGSN. SNDCP-, short messages and GPRS signalling messages are transmitted in LLC-frames which have a frame header containing numbering and a temporary address field, an information field of variable length and a frame check sequence. The functionality of LLC includes maintaining the communication context of mobile station MS and home support node SGSN, the transmitting of acknowledged and unacknowledged frames, the detection and retransmitting of corrupted frames. LLC-frames are transmitted in one or several radio blocks. The logical link is maintained when mobile station MS moves between cells within the area of one home support node SGSN. If mobile station MS moves into the area of another home support node SGSN, a new logical link must be established. The size of a LLC-protocol user data field is, as to the total number of bits, divisible by eight bits, i.e. it is octet oriented.

The next level C) after LLC, the RLC-level (Radio Link Control) has been explained in more detail in GSM standard specifications 03.64. The LLC-frame is being transmitted continuously. The variable length LLC-frames is transmitted in one or more RLC-blocks. The functionality of RLC between mobile station MS and home support node SGSN is to detect the corrupted RLC-blocks and to ask for a selective retransmission of the corrupted blocks. A retransmission request comprises a bit map indicating each air path block to be either corrupted or successfully received. Based upon the bit map the transmitter retransmits the corrupted blocks. The total size of an RLC-block is, the header and user data included, as to the number of bits, is divisible by eight bits, i.e. it is octet oriented.

Also level D), the MAC-level (Medium Access Control) has been explained in more detail in GSM standard specifications 03.64. MAC is used for dividing radio channels between mobile stations and for the allocating of a radio channel for a mobile station for transmission and reception as needed. The functionality of MAC includes a separate header containing uplink state flag USF (Uplink State Flag), block type indicator T and eventual power control information PC (Power Control). The MAC-header and the RLC-data block are placed in radio block RB (see FIGS. 2b and 2c) to be transmitted on the physical layer.

Protocol level E) describes the physical layer or GSM-radio path, in which messages are transferred in radio blocks RB presented in FIGS. 2b and 2c. Radio block RB includes a MAC-header, an information part containing the data or the signalling (RLC-data block, FIG. 2b or an RLC/MAC-signalling-information block, FIG. 2c) and block check sequence BCS (Block Check Sequence). Each radio block is interleaved in four standard bursts. Before the interleaving it is performed a channel coding on the radio block. For the channel coding there are four different coding schemes CS-1, CS-2, CS-3 and CS-4 (Coding Scheme). A mobile station must support all four alternatives. In the channel coding a convolutional coding is performed on the information part. A pre-coding is performed on uplink state flag USF (Uplink State Flag), in which case the length of USF after the pre-coding is dependent on the channel coding method CS-1 . . . CS-4 used. After the channel coding the size of the radio block is according to the GSM-specification 456 bits. Prior to the convolutional coding the payload according to the different coding method varies, and an octet oriented data stream is not achieved with all coding methods CS-1 . . . CS-4. Only CS-1 produces an octet oriented data stream, but the other the channel coding methods CS-2 . . . CS-4 do not do it according to the present protocols. This hampers data stream between different layers A)–E) in mobile station MS and in the mobile communications network, i.e. in base station system BSS and in home support node SGSN.

SUMMARY OF THE INVENTION

Now it is introduced such a method, with which data flow can be made simpler between all hierarchy levels or between mobile station MS and the different protocols of mobile communications network BSS; SGSN. This is achieved by bringing the user data flow into octet form on all protocol levels of the GPRS-service, in particular on the lower levels, by setting a certain number of bits as fill bits instead of using them for the transfer of user data. With this method it is possible to make the payload of a radio block octet oriented when any of channel coding methods CS-1 . . . CS-4 is used. A certain number of the bits of radio block RB, the being determined according to the method, are set prior to channel coding and the interleaving of the radio block (in four bursts) to transfer fill bits in such a way that the number of bits in the radio block transferring user data is divisible by eight prior to the channel coding. By using the method the handling of data, in particular that of the user data to be transferred, is made octet oriented on all GPRS-protocol levels. Because the radio block is made octet oriented the operation can after the channel coding be carried out fully in accordance with the GSM-specifications.

If this method were not used, the transmissions of two radio blocks would be mixed in such a way that the last bits of the preceding radio block would be transferred in the same burst with the first bits of the next radio block. This would make the handling of the data and protocols, and the equipment executing them difficult when octets coming from a higher protocol level should be distributed to different blocks on lower protocol levels.

The method according to the invention is characterized in that in the transfer bits of a radio block coded using at least a certain coding method it is transferred user data in a first part of the transfer bits and fill bits in a second part in such a way that it is chosen such a number bits for the of transfer user data which is divisible by eight.

The transmitter/receiver device according to the invention is correspondingly characterized in that it comprises control means for transferring user data in a first part of radio block transfer bits coded using at least a certain coding method and for transferring fill bits in a second part of said transfer bits, and said first part of transfer bits comprises a number of bits divisible by eight.

BRIEF DESCRIPTION OF THE DRAWINGS

The invention is described in detail in the following with reference to enclosed figures, of which

DETAILED DESCRIPTION

Figure 3:
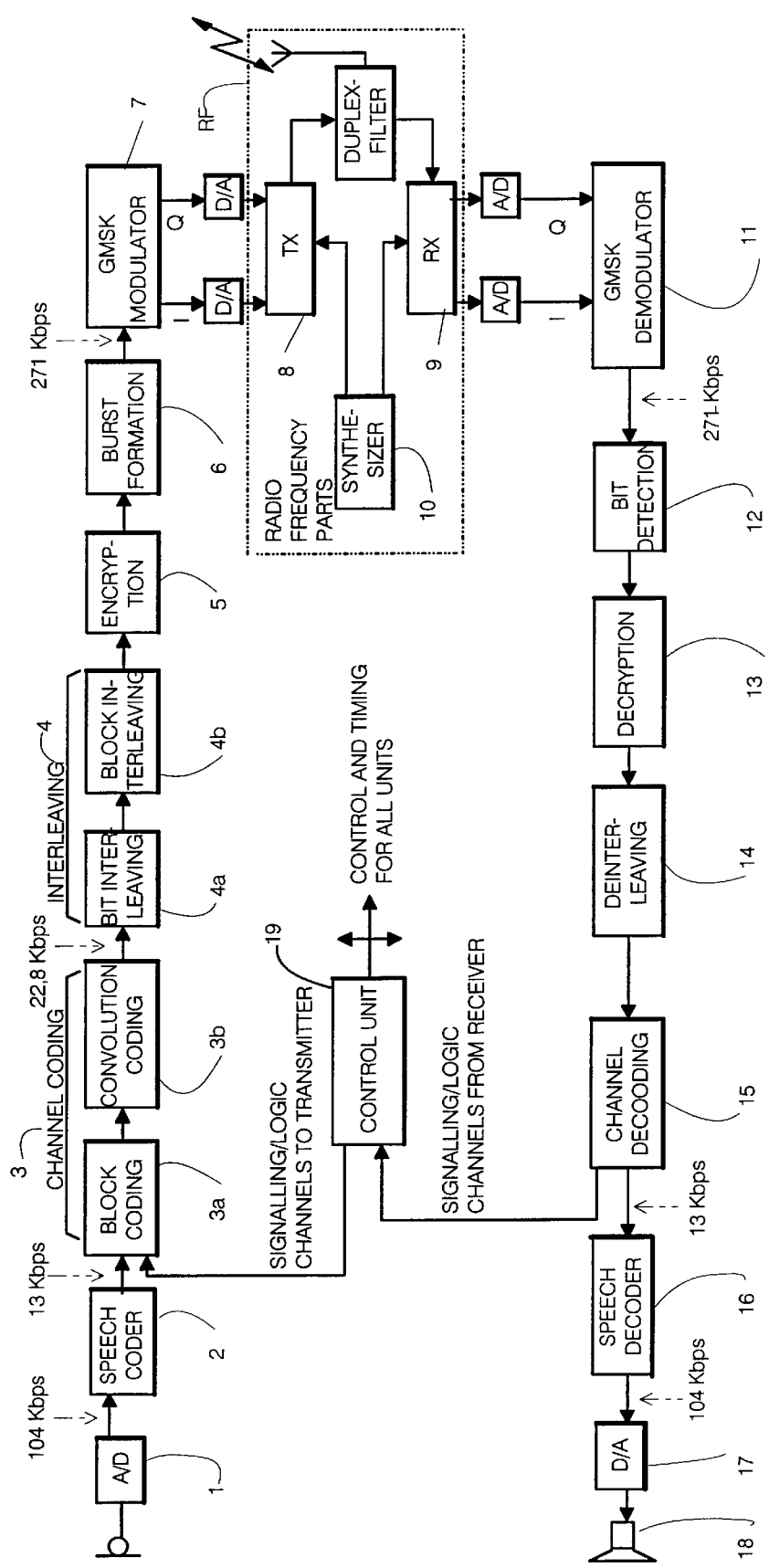
FIG. 3 presents the block diagram of a GSM-system transceiver.

In order to illustrate the handling of a transmitter/receiver and a physical layer according to the invention, it is explained in the following the transmitter- and receiver function of the GSM-system with reference to FIG. 3, in which it is presented a block diagram of a transmitter/receiver in a mobile telephone according to the GSM-system. The transmitter/receiver of a base station differs from the transmitter/receiver of a mobile telephone usually in the respect that it is a multi-channel one and it has no microphone nor loudspeaker, in other respects it is in structure and operating principle similar to the transmitter/receiver of a mobile telephone.

The first stage of a transmission sequence is digitizing 1 of analogue speech and encoding 2. Sampling with A/D-converter 1 is carried out a 8 kHz frequency and the speech encoding algorithm assumes the input signal to be 13 bit linear PCM. The samples obtained from the A/D-converter are segmented into 160-sample speech frames, in which case the duration of each speech frame is 20 ms. Speech encoder 2 handles 20 ms speech frames, i.e. prior to the commencing of the encoding it is taken 20 ms of speech in a buffer. The coding operations are performed frame by frame or on their subframes (in 40-sample blocks). As a result of the encoding by speech encoder 2 it is obtained 260 bits out of one frame.

After speech encoding 2 it is performed channel coding 3 for example in two stages depending on the coding method used, when at first one part of the bits (e.g. 50 most significant of 260 bits) are protected using block code 3a (=CRC, 3 bits) and after that these and the next most important bits (132) are further protected using convolutional code 3b (coding ratio 1/2) ((50+3+132+4)*2=378, and a part of the bits are taken unprotected (78). As presented in FIG. 3, signalling- and logical messages and the data to be transmitted come directly from control unit 19 controlling the blocks of the telephone to block coding block 3a, and thus naturally no speech encoding is performed on these data messages. Correspondingly, signalling- and logical messages and the received data are taken from channel decoding block 15 to control unit 19. In block encoding 3a a bit string is attached at the end of a speech frame, using which bit string it is possible to detect transfer errors at reception. In convolutional coding 3b it is increased the redundancy of a speech frame. All in all, a total of 456 bits per each 20 ms frame is transmitted.

These 456 bits are interleaved 4 and also interleaving 4 is performed in two stages. At first 4a the order of bits is mixed and the mixed bits are divided into eight blocks of equal size. These blocks are further distributed 4b into eight subsequent TDMA-frames, in which case the interleaved 456 bits are transmitted in eight time slots of the radio path (57 bits in each). With the interleaving it is striven for to spread transfer errors, which usually occur as error bursts, evenly over all the data to be transmitted, in which case the channel decoding operates at its most effective. After the deciphering of the interleaving an error burst is converted into individual error bits which can be corrected in the channel decoding. The following stage in the transmission sequence is the ciphering 5 of data. Ciphering 5 is carried out using an algorithm which is one of the most guarded secrets of GSM. With the ciphering it is striven for to prevent any unauthorized listening of calls.

Out of the ciphered data it is formed 6 a bust to be transmitted by adding in it a learning sequence, tail bits and a protection time. The burst to be transmitted is brought to GMSK-modulator 7 which modulates the burst for transmission. The GMSK-modulation method (Gaussian Minimum Shift Keying) is a digital, constant amplitude modulation method, in which the information is contained in the shifts of phase. Transmitter 8 mixes the modulated burst through one or more intermediate frequencies into 900 MHz and transmits it through an antenna to the radio path. Transmitter 8 is one of three radio frequency blocks RF. Receiver 9 is the first block on the reception side and it performs the operations inverted to those of transmitter 8. The third RF-block is synthesizer 10 which takes care of the forming of frequencies. In the GSM-system it is used frequency jumping, in which transmission- and reception frequencies are changed in each TDMA-frame. The frequency jumping improves the quality of the connection, but sets strict requirements on synthesizer 10. Synthesizer 10 must be capable of moving from one frequency to another very quickly, in less than one millisecond.

In reception it is carried out operations inverted to transmission. After RF-receiver 9 and demodulator 11 it is carried out bit detection 12 using for example a channel correction unit, in which bits are detected from the received samples i.e. it is tried to find out the transmitted bit sequence. After the detection ciphering 13 and interleaving 14 are deciphered and channel decoding 15 is performed on the detected bits and the check sum is checked using a cyclic redundance check (CRC, Cyclic Redundancy Check). In channel decoding 15 it is striven for to correct the bit errors occurred at the transfer of the burst. In a 260 bit speech frame after channel decoding 15 there are the transmitted parameters representing the speech, by using which speech decoder 16 forms the digital samples of the speech signal. The samples are D/A-converted 17 for reproduction with loudspeaker 18.

Figure 2A:
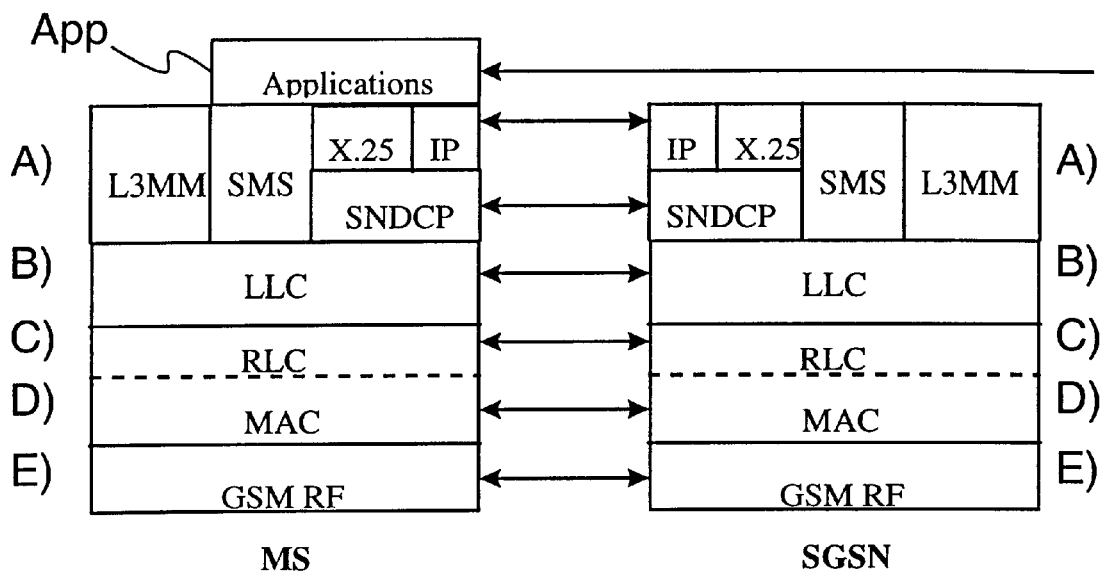
FIG. 2a presents the different protocols levels of the GPRS-service.

In a transmitter/receiver as the central control unit of a mobile station there is control unit 19 which essentially controls all blocks 1–18 and coordinates their operations and controls timing. Control unit 19 usually comprises for example a microprocessor. The protocols according to hierarchy level A)–D), presented in FIG. 2a, are executed preferably in control unit 19 and the processing of user data to the physical channel (in transmission beginning from channel coding an in reception until channel decoding) is performed in blocks 3–15.

For channel coding 3 there are four different coding schemes CS-1, CS-2, CS-3 and CS-4 (Coding Scheme). A mobile station must support each method. The data rates of these coding methods are 9.05, 13.4, 15.6 and 21.4 kbps respectively. Coding method CS-1 contains a convolutional coding having a coding ratio of 1/2, which is used in the GSM-system on the SDCCH-channel. In coding methods CS-2 and CS-3 it is also at first performed a convolutional coding having a coding ratio of 1/2, after which fill bits are removed by puncturing in order to achieve the desired 456 bits. Coding method CS-4 has no FEC-error protection (Forward Error Protection), i.e. no convolutional coding is performed on the data.

Figure 2B:
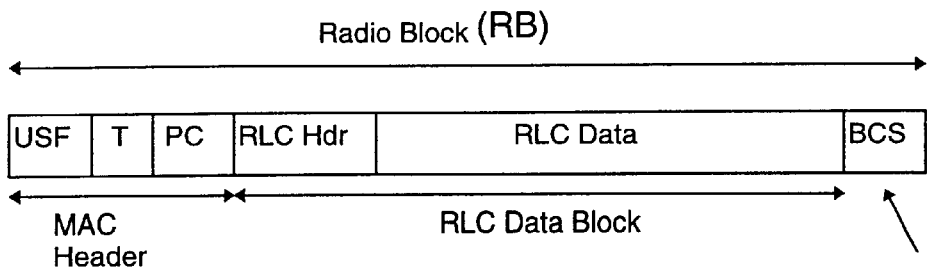
FIG. 2b presents a radio block to be transferred in the radio interface.
Figure 2C:
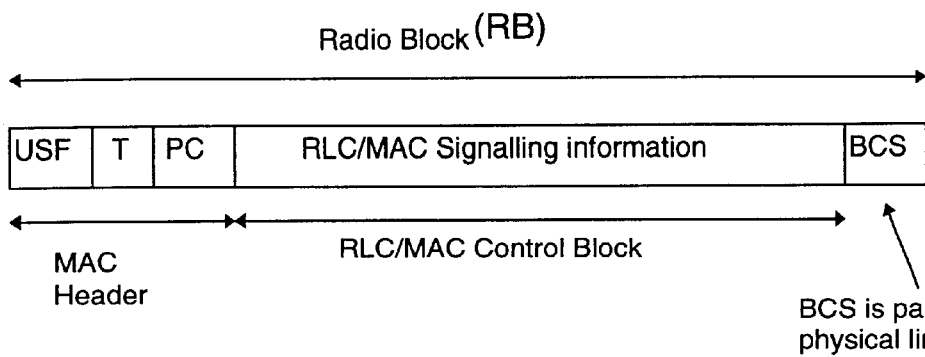
FIG. 2c presents another radio block to be transferred in the radio interface.

In the following it is explained in more detail the channel coding carried out in a packet data traffic channel (PDTCH, Packet Data Traffic Channel). Radio block RB presented in FIG. 2b, in which the RLC-data block is transferred, can be coded using one of the above channel coding methods CS-1 . . . CS-4, while radio block RB presented in FIG. 2c, in which the RLC/MAC-control block is transferred is always coded using channel coding method CS-1.

In the first stage of coding it is added at the end of a radio block a block check sequence BCS (Block Check Sequence) for error detection. After this in coding methods CS-1 . . . CS-3 it is performed on the uplink status flag or USF a pre-coding (except in method CS-1), four tail bits are added and convolutional coding is performed according to above description, and puncturing in methods CS-2 and CS-3 in order to achieve the desired coding rate (456 bits).

The coding parameters of the different methods are presented below in Table 1.

methods (column a). Block check sequence BCS is 40 bits in CS-1 method and in the other methods 16 bits (column c). After convolutional coding 3b with code rate 1/2 it is obtained 456, 588 and 676 coded bits in methods CS-1 . . . CS-3 and in method CS-4 it is obtained directly 456 bits without convolutional coding (column e). By adding together the bits in columns a–d it is obtained the payload according to each method. It is then seen that the payload in methods CS-1, CS-2 and CS-3 is 228, 294 and 338 bits and the number of bits is doubled in the convolutional coding in accordance with column e. In method CS-4 it is obtained a payload of 456 bits. When it is known that the length of a pre-coded USF varies 3–12 bits and that the total length of T and PC is 5 bits, it is obtained as the size of a MAC-header field 8, 11, 11 and 17 bits. The number of tail bits is 4 in methods CS-1 . . . CS-3 and 0 in method CS-4. In this way the number of bits available for the transfer of the other data is as presented in Table 2.

TABLE 2

| Payload bits | MAC header | BCS | Tail bits | Remaining bits |
|---|---|---|---|---|
| CS-1: 228 – | 8 – | 40 – | 4 = | 176 |
| CS-2: 294 – | 11 – | 16 – | 4 = | 263 |
| CS-3: 338 – | 11 – | 16 – | 4 = | 307 |
| CS-4: 456 – | 17 – | 16 – | 0 = | 423 |

In these bits it is transferred the RLC-header and the RLC-data containing the actual user data. These are in the RLC-layer (layer C in FIG. 2a) divisible by eight. In order to keep the handling and transfer of user data octet oriented according to the invention, two octets or 16 bits are reserved for the header field, and the number of RLC-data block bits

TABLE 1

| Scheme | Code rate | USF | Precoded USF (a) | Radio Block excl. USF and BCS (b) | BCS (c) | Tail (d) | Coded bits (e) | Punctured bits (f) | Data rate kb/s |
|---|---|---|---|---|---|---|---|---|---|
| CS-1 | ½ | 3 | 3 | 181 | 40 | 4 | 456 | 0 | 9.05 |
| CS-2 | ≈⅔ | 3 | 6 | 268 | 16 | 4 | 588 | 132 | 13.4 |
| CS-3 | ≈¾ | 3 | 6 | 312 | 16 | 4 | 676 | 220 | 15.6 |
| CS-4 | 1 | 3 | 12 | 428 | 16 | — | 456 | — | 21.4 |

Table 1 shows that the length of USF after pre-coding/bit processing is 3, 6, 6 and 12 bits respectively in the different shown in Table 3 is transferred, when in certain methods bits are left over for user data transfer.

TABLE 3

| Payload bits | MAC header | | RLC header | | RLC data bits | | BCS | | Tail bits | | Additional bits |
|---|---|---|---|---|---|---|---|---|---|---|---|
| CS-1: 228 = | 8 | + | 16 | + | 160 | + | 40 | + | 4 | + | 0 |
| CS-2: 294 = | 11 | + | 16 | + | 240 | + | 16 | + | 4 | + | 7 |
| CS-3: 338 = | 11 | + | 16 | + | 288 | + | 16 | + | 4 | + | 3 |
| CS-4: 456 | 17 | + | 16 | + | 400 | + | 16 | + | 0 | + | 7 |

According to the invention it is not user data that is transferred in these additional bits of a radio block but fill bits in order to arrange the handling and transfer of user data to be octet oriented, i.e. divisible by eight. According to the invention in the fill bits of a radio block, i.e. in a certain amount of bits reserved for the transfer of user data it is transferred fill bits, depending on channel coding method CS-1 . . . CS-4. This is done by giving the concerned bits a predetermined value, either logical "1" or logical "0". However, in order to get as much user data as possible transferred in a radio block, it is preferably transferred only such a quantity of fill bits, less than an octet, which leaves as many as possible octets available for the transfer of user data. Such quantities are presented in Table 3.

Figure 1:
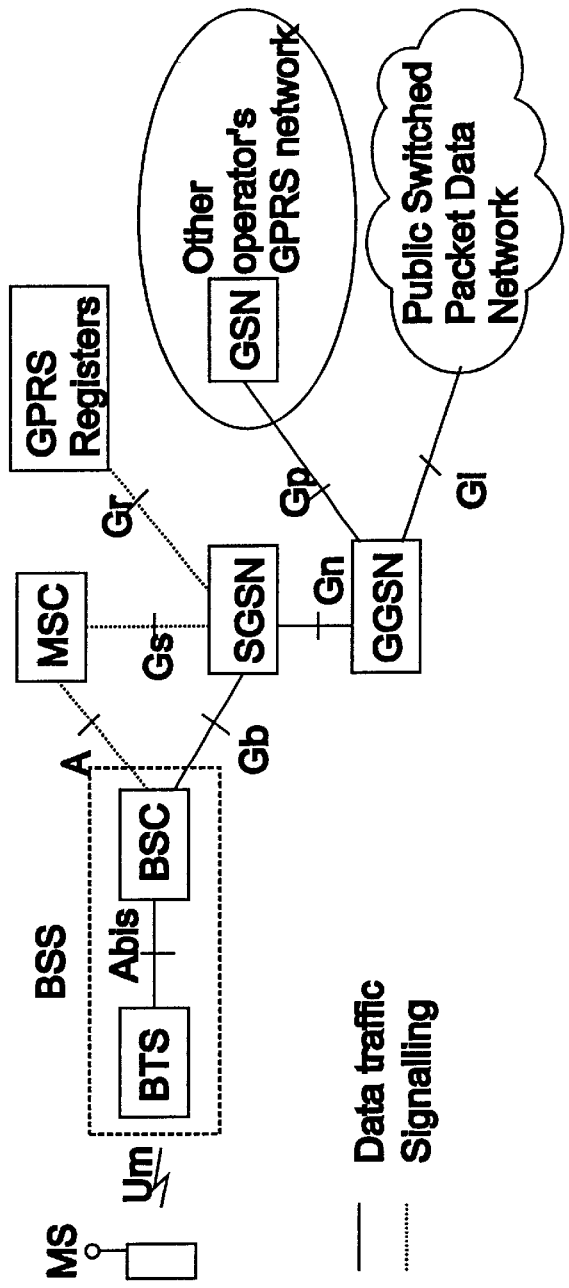
FIG. 1 presents the structure of a telecommunication network in the GSM GPRS-packet service data transfer.
Figure 4:
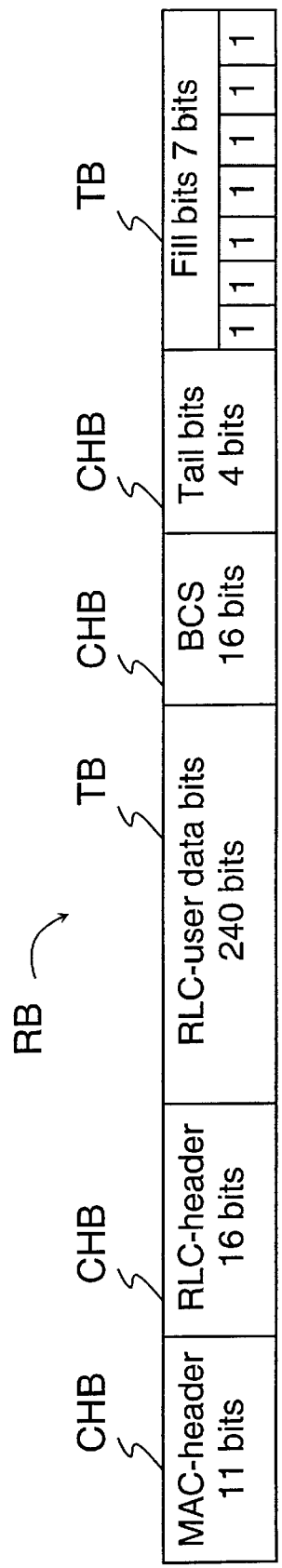
FIG. 4 presents a radio block according to the invention to be transferred in the radio interface.

Thence 0 bits (i.e. none) is set as fill bits in channel coding method CS-1. In channel coding method CS-2 for example the seven last bits are chosen as the fill bits, in channel coding method CS-3 3 additional bits (for example 3 last bits) are chosen as the fill bits and in channel coding method CS-4 it is selected 7 additional bits (for example the last 7 bits) as the fill bits. FIG. 4 presents an example of the contents of a radio block payload in the method according to the invention when coding method CS-2 is used. The payload comprises check bits CHB connected with the performing of the transfer, in which bits it is transferred the MAC-header bits, RLC-header bits, BCS-bits and the tail bits, and transfer bits TB used for the transfer of user data, in which bits it is here transferred the RLC-user data bits and the seven fill bits at the end, which bits otherwise could be used for the transfer of user data. In a radio block according to FIG. 4 it is transferred user data in octets (bytes), in which case handling between different hierarchy levels is kept simple. According to the invention the maximum amount of user data bits transferred in a radio block is obtained by dividing the number of transfer bits TB by eight and by transferring user data in the number of octets (bytes) corresponding to the quotient and by transferring fill bits in the number of transfer bits corresponding to the remainder.

By utilizing the invention it is obtained in each channel coding method an octet oriented number of user data bits or RLC-data bits. At the same it is further obtained after the channel coding and the puncturing presented in Table 1, in each method the desired number of bits, 456. In this way the puncturing need not be changed. This is achieved because the size of the payload is in the method according to the invention kept unchanged with respect to the payloads defined in GSM standard specification 03.64.

Alternatively the payloads of methods CS-2 and CS-3 are increased, for example in CS-2 by one bit to 295 and in CS-3 by five bits to 343, in which case it would be obtained one more octet for the transfer of user data (with the additional bits noted in Table 3 regarded). Then the number of bits after the convolutional coding would be 590 and 686, in which case the puncturing should be altered by puncturing 134 and 230 bits respectively. If correspondingly the payload should be reduced by 7 and 3 bits, the puncturing should be reduced. Such alternative methods would however require the changing of both the payload and the puncturing in the GSM standard specification 03.64, which is not desirable.

Thanks to the invention data stream through different layers from the higher layers down to the lowest physical layer is made octet oriented, which simplifies the executing of protocols between mobile station MS and fixed network BSS, SGSN. At the same a certain number of bits is lost (0, 7, 3, 7), which bits otherwise could be used for the transfer of user data. When the certain number of bits according to the invention is chosen in such a way that the number is less than an octet and at the same the number of bits in a RLC-data block is adjusted to divisible by eight, the achieving of simpler protocols is however more important than the loss of a few bits for the transfer of user data.

The above has been an introduction of the realization of the invention and its embodiments using examples. It is self evident to persons skilled in the art that the invention is not limited to the details of the above presented examples and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

What is claimed is:

1. A method for data transfer in a digital mobile communications system, in which method user data is handled in layers according to protocols, in one layer of said layers user data is transferred over a physical radio channel between a mobile station and a fixed mobile communications network in radio blocks, for the transfer of said one layer a payload of a size comprising check bits connected with the performing of the transfer and transfer bits available for the transfer of the user data is formed in the radio block, each radio block is channel coded using a coding method and the size of said payload is dependent on the coding method, wherein in the transfer bits of a radio block to be coded using at least said coding method, user data is transferred in a first part of the transfer bits and fill bits are transferred in a second part so that, for the transfer of user data, such a number of transfer bits is chosen which is divisible by eight.

2. A method according to claim 1, wherein as the first part of transfer bits for use for the transfer of user data it is chosen the number of octets indicated by the quotient when the number of transfer bits is divided by eight, and as the second part of transfer bits for use for the transfer of the fill bits it is chosen the number of transfer bits indicated by the remainder of said division.

3. A method according to claim 1, wherein the radio block is one of the radio blocks according to the GSM standard specification 03.64, except for said fill bits.

4. A method according to claim 1, wherein in said second part of transfer bits fill bits are set prior to the channel coding performed in the channel coding and prior to interleaving of the bits of the radio block into bursts to be transmitted.

5. A transmitter/receiver device for transmitting user data in a digital mobile communications system, which device comprises user data handling means for the handling of user data in layers according to protocols, transmitting means for transmitting user data in radio blocks over a physical radio channel in one layer of said layers, payload forming means for the forming of a payload of a predetermined size in a radio block for the transfer of said one layer, said payload comprising check bits connected with the performing of the transfer and transfer bits available for the transfer of user data, channel coding means for the channel coding of a radio block using a coding method, and said size of the payload is dependent on the coding method used, wherein the device comprises control means for transferring user data in a first part of radio block transfer bits, the radio block being coded using at least said coding method, and for transferring fill bits in a second part of said transfer bits, and said first part of the transfer bits comprises a number of bits divisible by eight.

6. A transmitter/receiver device according to claim 5, wherein said control means have been arranged to choose as the first part of transfer bits to be used for the transfer of user data the number of octets obtained by the quotient when the number of transfer bits is divided by eight, and said control means have been arranged to choose as the second part of transfer bits to be used for the transfer of the fill bits the number of bits indicated by the remainder of said division.

7. A transmitter/receiver device according to claim 5, wherein it has been arranged to transfer transfer bits according to the GSM standard specification 03.64, except for said fill bits.

8. A digital mobile communications system comprising at least one mobile station and a fixed mobile communications network, which system comprises means for transferring user data over a physical radio channel between the mobile station and the fixed mobile communications network, user data handling means for the handling of user data in layers according to protocols, data transfer means for the transfer of user data in radio blocks over a physical radio channel in one layer of said layers, payload forming means for the forming of a payload of a size in a radio block for the transfer of said one layer, said payload comprising check bits connected with the performing of the transfer and transfer bits available for the transfer of user data, channel coding means for the channel coding of the radio block using a coding method and the size of said payload is dependent on the coding method, wherein the system comprises control means for transferring user data in a first part of transfer bits of the radio block to be coded using at least said coding method, and for the transfer of fill bits in a second part of said transfer bits, and said first part of transfer bits comprises a number of bits divisible by eight.

9. A digital mobile communications system according to claim 8, wherein said control means have been arranged to choose as the first part of transfer bits to be used for the transfer of user data the number of octets according to the quotient obtained when the number of transfer bits is divided by eight, and said control means have been arranged to choose as the second part of transfer bits to be used for the transfer of fill bits the number of transfer bits according to the remainder of said division.

10. A mobile communications system according to claim 8, wherein it has been arranged to transfer transfer bits according to the GSM standard specification 03.64, except for said fill bits.

11. A method for transceiving a first user data in a digital mobile communications system having a first mobile station and a first fixed mobile communications system, the method comprising the steps of:

selecting a first protocol coding format;

translating the first user data in a first layer according to the first protocol format;

transceiving the first user data over a physical communications channel between the first mobile station and the first fixed mobile communications system, wherein transceiving the first user data comprises the steps of:

selecting a first channel code;

encoding the first user data according to the first channel code, wherein the step of encoding the first user data further comprises the steps of:

using dummy bits where necessary to make the first user data divisible by eight;

encoding the now divisible by eight first user data; and transceiving the first user data.

12. A method according to claim 11, wherein the step of encoding the first user data to be divisible by eight further comprises the steps of:

determining a first number of octets of the first user data from the quotient of dividing the first user data by eight; and determining a second number of dummy bits from the remainder of dividing the first user data by eight.

* * * * *